(12) United States Patent
Birsan et al.

(10) Patent No.: US 8,880,756 B1
(45) Date of Patent: Nov. 4, 2014

(54) DIRECT MEMORY ACCESS CONTROLLER

(71) Applicant: Atmel Corporation, San Jose, CA (US)

(72) Inventors: Laurentiu Birsan, Saint Herblain (FR); Frode Milch Pedersen, Trondheim (NO); Nicolas Graffet, Rousset (FR); Stein Danielsen, Flatasen (NO); Sebastien Jouin, La Chapelle-Launay (FR)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 13/932,925

(22) Filed: Jul. 1, 2013

(51) Int. Cl.
*G06F 13/28* (2006.01)
*G01R 31/08* (2006.01)

(52) U.S. Cl.
CPC ..................................... *G06F 13/28* (2013.01)
USPC ............................................ 710/22; 370/235

(58) Field of Classification Search
None
See application file for complete search history.

(56) References Cited

U.S. PATENT DOCUMENTS

| | | | |
|---|---|---|---|
| 2004/0054822 A1* | 3/2004 | Biran et al. | 710/15 |
| 2004/0057380 A1* | 3/2004 | Biran et al. | 370/235 |
| 2008/0126600 A1* | 5/2008 | Mitchell et al. | 710/22 |
| 2008/0159140 A1* | 7/2008 | Robinson et al. | 370/232 |

* cited by examiner

*Primary Examiner* — Hyun Nam
(74) *Attorney, Agent, or Firm* — Fish & Richardson P.C.

(57) ABSTRACT

Systems and methods for direct memory access are described. One example system includes a memory module that includes a first memory portion that maintains transfer descriptors of direct memory access (DMA) channels, and a second memory portion that maintains transfer descriptors of enabled DMA channels. The system includes a controller coupled to the memory module, the controller includes one or more DMA channels coupled to a system bus, a channel arbiter that selects one of the enabled DMA channels as an active DMA channel for data transfer including re-arbitrating after each burst or beat in a given transfer, and an active channel buffer that receives a transfer descriptor of the active DMA channel from the second memory portion. The controller is configured to write back the transfer descriptor of the active DMA channel into the second memory portion when the active DMA channel loses arbitration.

20 Claims, 5 Drawing Sheets

DIRECT MEMORY ACCESS CONTROLLER

TECHNICAL FIELD

This disclosure relates generally to electronics including controllers.

BACKGROUND

Microcontrollers can be used for controlling other devices. Examples devices that can be controlled by microcontrollers include analog to digital converters, digital to analog converters, input and output ports, direct memory access (DMA) controllers, and memories.

A DMA controller can be used to transfer data between a memory device and another device, such as one controlled by a microcontroller, and thus can enable high speed data transfer with little central processing unit (CPU) involvement. The DMA controller may move data between memories and devices using one or more physical DMA channels and may support a number of independent and parallel data transfers.

Physical DMA channels may be shared among one or more devices and the DMA controllers may adopt a policy of prioritizing and scheduling for assigning time slots of physical DMA channels among the devices that share the same physical DMA channel.

SUMMARY

In one aspect, a system includes a memory module including a first memory portion that maintains transfer descriptors of direct memory access (DMA) channels, and a second memory portion that maintains transfer descriptors of enabled DMA channels; and a controller coupled to the memory module. The controller includes one or more DMA channels coupled to a system bus, a channel arbiter that selects one of the enabled DMA channels as an active DMA channel for data transfer based on one or more criteria including re-arbitrating after each burst or beat in a given transfer, and an active channel buffer that receives a transfer descriptor of the active DMA channel from the second memory portion. The controller is configured to write back the transfer descriptor of the active DMA channel into the second memory portion when the active DMA channel loses arbitration during data transfer.

In another aspect, a method includes enabling one or more direct memory access (DMA) channels; receiving transfer requests for enabled DMA channels; arbitrating, based on one or more criteria, among enabled DMA channels having pending transfer requests; selecting one of the enabled DMA channels as an active DMA channel based on the arbitrating; fetching a first transfer descriptor of the active DMA channel; performing data transfer using the active DMA channel; and during the performing, checking to determine when the active DMA channel has a priority that is less than a priority for another one of the enabled DMA channels and when so, disabling the then active DMA channel including writing back to memory a current state of the first transfer descriptor and making the another one of the enabled DMA channels the active DMA channel.

Implementations may include one or more of the following features. The controller may be configured to communicate with one or more peripheral devices, and each peripheral device may be associated with a DMA channel. Each transfer descriptor of the first memory portion may correspond to a peripheral device. The channel arbiter may receive DMA transfer requests for the DMA channels and a DMA transfer request may be triggered by one or more of a peripheral device, software, or an event. The controller may use the active DMA channel for data transfer and may update the transfer descriptor of the active DMA channel in the active channel buffer.

The system may include a first dedicated interface between the first memory portion of the memory module and the controller, and a second dedicated interface between the second memory portion of the memory module and the controller. The first dedicated interface can be a single directional interface coupling the first memory portion to the controller. The active channel buffer can be a register.

The system may be coupled to a peripheral bus interface that may enable the configuration of the controller by an external device. A transfer descriptor may define a block data transfer and may include one or more parameters such as a source address of a transfer, a destination address of the transfer, a number of remaining transfer beats, control data including transfer settings, or an address of a next descriptor.

The system may be configured to update one or more parameters of the transfer descriptor of the active DMA channel during data transfer. Updating the transfer descriptor may include updating one or more parameters of the transfer descriptor. The parameters may include the source address of a transfer, the destination address of the transfer, or the number of remaining transfer beats. Software may be configured to enable or disable DMA channels.

The system may disable a DMA channel and may remove (e.g., delete or overwrite) the transfer descriptor of the DMA channel from the second memory portion when the number of remaining transfer beats of a transfer descriptor of an enabled DMA channel reaches zero.

Performing data transfer may include transferring bursts of data and updating the first transfer descriptor of the active DMA channel after each burst of data including updating a number of remaining transfer beats. After each burst of data one of, disabling the active DMA channel and clearing the first descriptor of the active DMA channel when the number of remaining transfer beats reaches zero, or interrupting the data transfer and re-storing the updated first transfer descriptor of the active DMA channel when losing arbitration may be performed.

Enabling one or more direct memory access (DMA) channels may include fetching transfer descriptors of the DMA channels, and storing the received transfer descriptors of the enabled DMA channels.

The method may include retrieving a second descriptor of the active DMA channel when the number of remaining transfer beats of the first descriptor reaches zero. The second descriptor may be retrieved using an address of a next descriptor of the first transfer descriptor. The method may include assigning priority levels to each DMA channel, wherein a DMA channel with higher priority level may interrupt any ongoing data transfers through DMA channels with lower priority levels.

Aspects of the invention may implement none, one or more of the following advantages. Proposed systems and methods can be used to implement a DMA controller that incorporates virtual (shared) DMA channels and uses transfer descriptors for block data transfers through DMA channels.

The details of one or more implementations are set forth in the accompanying drawings and the description below. Other aspects, features, and advantages will be apparent from the description and drawings, and from the claims.

DETAILED DESCRIPTION

Microcontrollers can be used to control one or more other devices (as will be referred to hereafter as, peripheral devices). A DMA controller can enable high speed transfer of data between memories and peripheral devices with little involvement of the CPU of the microcontroller. In addition, DMA controllers can enable direct data transfers between peripheral devices or between memory locations.

Data transfers can be characterized as either single beat or burst. Burst accesses include consecutive single beat accesses wherein a beat access includes a single bus access. The beat size can vary depending on the architecture of the system, and can be configured to support, for example, sizes of a byte, a half-word, or a word. A burst may be defined as N beats where N can be an integer, such as 1, 4, 8, or 16 in some configurations.

A complete DMA read and write operation between memories and/or peripherals is referred to as a DMA transaction. A read or write operation can be performed in data blocks. Data block sizes may be controlled/configurable by software and can be divided into smaller burst transfers. Typically data block size may be configurable, such as from 1 byte to 256 KB.

A DMA transfer may be initiated when a DMA transfer request is detected. A transfer request can be triggered by, for example, software, a peripheral device, in response to an event, or a combination thereof. A DMA channel may generate an event after a beat transfer, a burst transfer, or a block transfer.

Figure 1:
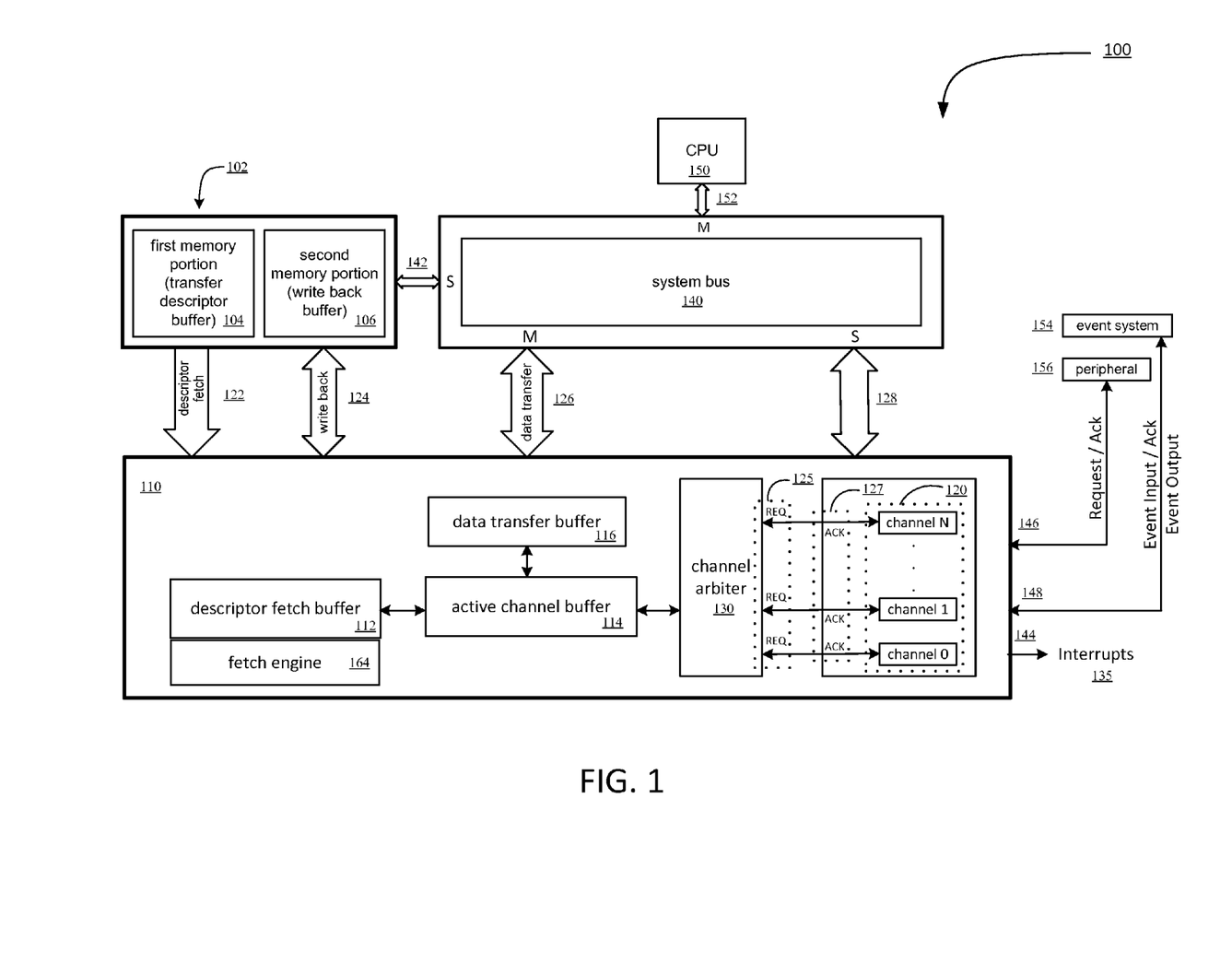
FIG. 1 is a diagram of an example system that can be used for direct memory access.

Referring to FIG. 1, an example of a system 100 is shown that includes a controller 110 coupled to a memory module 102. The memory module 102 includes a transfer descriptor buffer as a first memory portion 104 and a write back buffer as second memory portion 106.

The first memory portion 104 maintains the transfer descriptors for the DMA channels. The transfer descriptors of DMA channels include the data that defines a block transfer and may include the source and destination addresses and the number of beats to be transferred. Transfer descriptors of DMA channels are described in greater detail below with respect to FIG. 2B.

The second memory portion 106 maintains the transfer descriptors of enabled DMA channels. The DMA channels can be enabled by software. The enabling of DMA channels is described in greater detail below with respect to FIG. 2A.

The controller 110 includes one or more DMA channels 120 and an active channel buffer 114. The controller 110 also includes a channel arbiter 130 which receives transfer requests 125 for DMA channels 120. Based on channel priority levels and a scheduling scheme, the channel arbiter 130 selects one of the DMA channels 120 as the active DMA channel for data transfer. In response to the active DMA channel selection by the channel arbiter 130, the controller 110 retrieves the transfer descriptor of the selected active channel from the second memory portion 106 and provides the transfer descriptor for storage in the active channel buffer 114. Based on the transfer descriptor parameters in the active channel buffer 114, the controller 110 may use the active DMA channel for transferring data.

The system 100 includes a descriptor fetch bus interface 122 that couples the first memory portion 104 to the controller 110. In some implementations, the descriptor fetch bus interface 122 may be single directional and can be configured to transfer the transfer descriptors from the memory portion 104 to the controller 110. Using a single directional descriptor fetch bus interface 122, the controller 110 may not modify the transfer descriptors maintained in memory portion 104.

The system 100 includes a write back bus interface 124 that couples the second memory portion 106 to the controller 110. The write back bus interface 124 can be configured to retrieve the transfer descriptors of the enabled DMA channels from the second memory portion 106. The write back bus interface 124 may also enable the transfer descriptors of the enabled DMA channels to be re-stored in the second memory portion 106.

In some implementations, the first memory portion 104 and the second memory portion 106 may be dedicated portions of the memory module 102 assigned for maintaining transfer descriptors of the DMA channels and the transfer descriptors of enabled DMA channels.

In some implementations, the controller 110 may be configured to communicate with one or more peripheral devices and receive data transfer requests from a peripheral device through the input port 146 of the controller 110. In some implementations, each peripheral device can be associated with one DMA channel and the data transfer requests can be received by the channel associated with the peripheral device and the DMA channels 120 may transfer the requests 125 to the channel arbiter 130.

In some implementations, the DMA channels 120 may be configured to determine when data transfer requests 125 can be generated. As an example, a software request, an event received from an event system 154 through the input port 148 of the controller 110, or a request received from a peripheral device 156 through the input port 146 can trigger a DMA channel to initiate a DMA transfer request, in some implementations, data transfer requests can be of the form of a transfer request for transferring data from memory to a peripheral device, a transfer request for transferring data between two peripheral devices, a transfer request for transferring data from a peripheral device to memory, or a transfer request for transferring data between two memory locations.

In some implementations, the controller 110 includes a descriptor fetch buffer 112 and a fetch engine 164. The fetch engine 164 can be configured to move the transfer descriptor of the active DMA channel from the second memory portion 106 to the descriptor fetch buffer 112 and then move the transfer descriptor of the active DMA channel to the active channel buffer 114. In some implementations, the fetch engine 164 may directly move the transfer descriptor of the active DMA channel from the second memory portion 106 to the active channel buffer 114.

In some implementations, the controller 110 may be coupled to system bus 140 by a data transfer bus interface 126. The data transfer bus interface 126 can be used for sending for receiving data through system bus 140.

In some implementations, a CPU 150 may be coupled by a bus interface 152 to the system bus 140. In some implementations, the system bus 140 and the memory module 102 may be coupled by a bus interface 142 so as to enable the CPU 150 to access the memory module 102. In some implementations, software can be configured to create or remove the transfer descriptors of DMA channels in the first memory portion 104. In some implementations, software can be used to command the controller 110 to enable DMA channels (using the system bus 140 and bus interfaces 152 and 128). In some implementations, software can be configured to access the first and second memory portions 104 or 106 so as to enable creation, update, or removal (e.g., deleting or overwriting) of the transfer descriptors.

In some implementations, a transfer request 125 can be either acknowledged or kept pending until it has priority. When a transfer request of a DMA channel is acknowledged (such as by sending an acknowledge signal 127), the transfer descriptor of the selected active DMA channel can be retrieved from the second memory portion 106, placed in the active channel buffer 114 and a burst transfer can be started.

In some implementations, the controller can generate interrupt requests 135 on node 144. The interrupt requests 135 can be generated when a transaction is complete or when the controller 110 detects an error on a DMA channel 120.

In some implementations, the active channel buffer 114 or the descriptor fetch buffer 112 is of the form of a register. In some implementations, the controller 110 can be configured by the CPU 150 through the system bus 140 and interfaces 152 and 128.

Figure 2A:
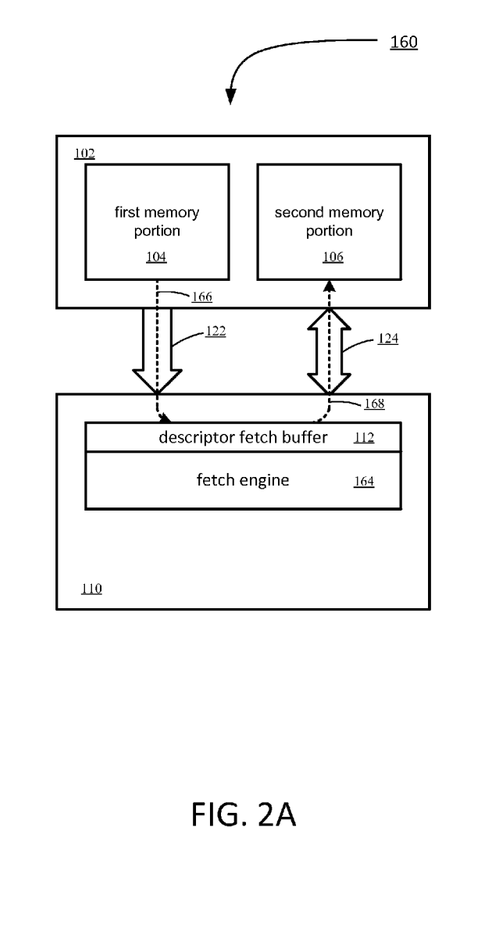
FIG. 2A is a diagram of an example system for enabling DMA channels.

Referring to FIG. 2A, an example of a system 160 for enabling DMA channels is shown. The system 160 includes the controller 110 and the memory module 102. The controller 110 fetches a transfer descriptor of a DMA channel from first memory portion 104 of the memory module 102 and places the descriptor in a descriptor fetch buffer 112 using the single directional descriptor fetch bus interface 122. The transfer direction is shown by arrow 166 from the first memory portion 104 to the descriptor fetch buffer 112. In some implementations, the descriptor fetch buffer 112 can hold one transfer descriptor and the retrieval can be performed by the fetch engine 164.

After retrieving a transfer descriptor of a DMA channel, the controller 110 may enable the DMA channel by copying the retrieved transfer descriptor to the second memory portion 106 of the memory module 102 using the write back bus interface 124. The transfer can be performed by the fetch engine 164 and is shown by arrow 168 from the descriptor fetch buffer 112 to the second memory portion 106.

In some implementations, the first memory portion 104 and the second memory portion 106 may be dedicated portions of the memory module 102 that can be assigned for maintaining transfer descriptors of the DMA channels and the transfer descriptors of enabled DMA channels.

In some implementations, the descriptor fetch bus interface 122 between the first memory portion 104 and descriptor fetch buffer 112 can be a dedicated interface. In some implementations, the write back bus interface 124 between the second memory portion 106 and buffer 112 can be a dedicated interface.

In some implementations, software can be used to command the controller to enable one or more DMA channels. In some implementations, the descriptor fetch buffer 112 may hold more than one transfer descriptor. In some implementations, one or more peripheral devices may be coupled to the controller 110. One corresponding DMA channel for each peripheral device can be designated and one corresponding transfer descriptor for each DMA channel can be stored in first memory portion 104.

Figure 2B:
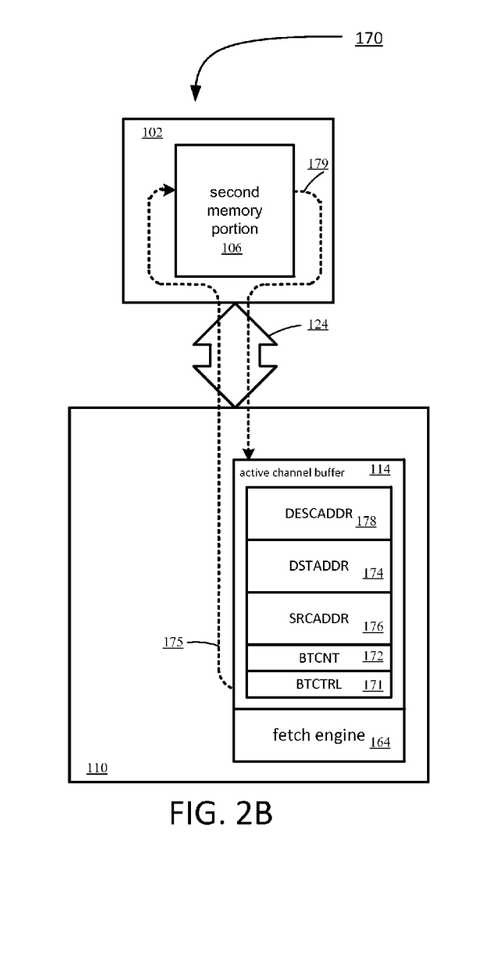
FIG. 2B is a diagram of an example system for updating transfer descriptors.

Referring to FIG. 2B, an example of a system 170 for retrieving and updating a transfer descriptor of an active DMA channel is shown. The system 170 includes the controller 110 that can fetch the transfer descriptor of an active DMA channel from second memory portion 106 of the memory module 102 and transfer the descriptor to the active channel buffer 114 using the write back bus interface 124. The data transfer is shown by arrow 179 from the second memory portion 106 to the active channel buffer 114. As an example, the active channel buffer 114 can hold one transfer descriptor and the retrieval can be performed by the fetch engine 164.

The transfer descriptor of the active DMA channel can be used for performing a DMA data transfer transaction and may, in some implementations, include five fields. In the example shown, the transfer descriptor may include a first block transfer control (BTCTRL) field 171 that can designates transfer control parameters and may include a second block transfer counter (BTCNT) field 172 that can designate the number of beats to be transferred. The third source address (SRCADDR) field 176 may define the address from which the data can be read during a transfer and the fourth destination address (DSTADDR) field 174 may define the address to which the data may be written during a data transfer. The fifth descriptor next address (DESCADDR) field 178 may include the memory address where the next descriptor can be retrieved.

The BTCTRL field 171 defines transfer parameters and the transfer descriptor of the active DMA channel can be updated by the controller 110 after each transfer burst. As an example the update can include updating the number of remaining beats (BTCNT field 172), the source address (SRCADDR field 176), or the destination address (DSTADDR field 174).

When the active DMA channel loses arbitration and another channel wins arbitration, the transfer descriptor in the active channel buffer 114 can be re-stored to the second memory portion 106. The data transfer is shown by arrow 175 from the active channel buffer 114 to the second memory portion 106 and can be performed by the fetch engine 164.

The BTCTRL field 171 may specify one or more parameters for controlling the data transfer. As an example the BTCTRL field 171 may include a parameter that indicates the descriptor is a valid transfer descriptor. The BTCTRL field 171 may hold data transfer parameters indicating when an event or an interrupt request is generated by a DMA channel and may include bus access type, burst size, or transfer size.

In some implementations, the DESCADDR field 178 can be set to zero indicating the transfer descriptor may be used for transfer of a single data block. In some implementations, the DESCADDR field 178 can be set to a valid memory address indicating a linked list of descriptors when multiple blocks may be transferred. Linked transfer descriptors are described with reference to FIG. 5. In some implementations, based on some settings in BTCTRL field 171, the destination address and the source address may be static. In some implementations, based on some settings in BTCTRL field 171, the destination address and the source address may be incremented.

In some implementations when the number of remaining beats (BTCNT field 172) of the transfer descriptor of the active DMA channel becomes zero and the data transfer is complete, the associated DMA channel may be disabled and the corresponding transfer descriptor may be removed (e.g., deleted, erased, or overwritten) from the second memory portion 106.

In some implementations when the number of remaining beats (BTCNT field 172) of the transfer descriptor of the active DMA channel becomes zero and the data transfer is complete, the associated DMA channel may be disabled and the corresponding transfer descriptor may be removed from the second memory portion 106 during the next enabling of one or more DMA channels.

In some implementations, depending on DMA channel settings, when a DMA channel is triggered (i.e., initiated) the DMA channel may send different types of transfer requests including a block transfer request, a burst transfer request, a beat transfer request, or a multi block transfer request.

Figure 3:
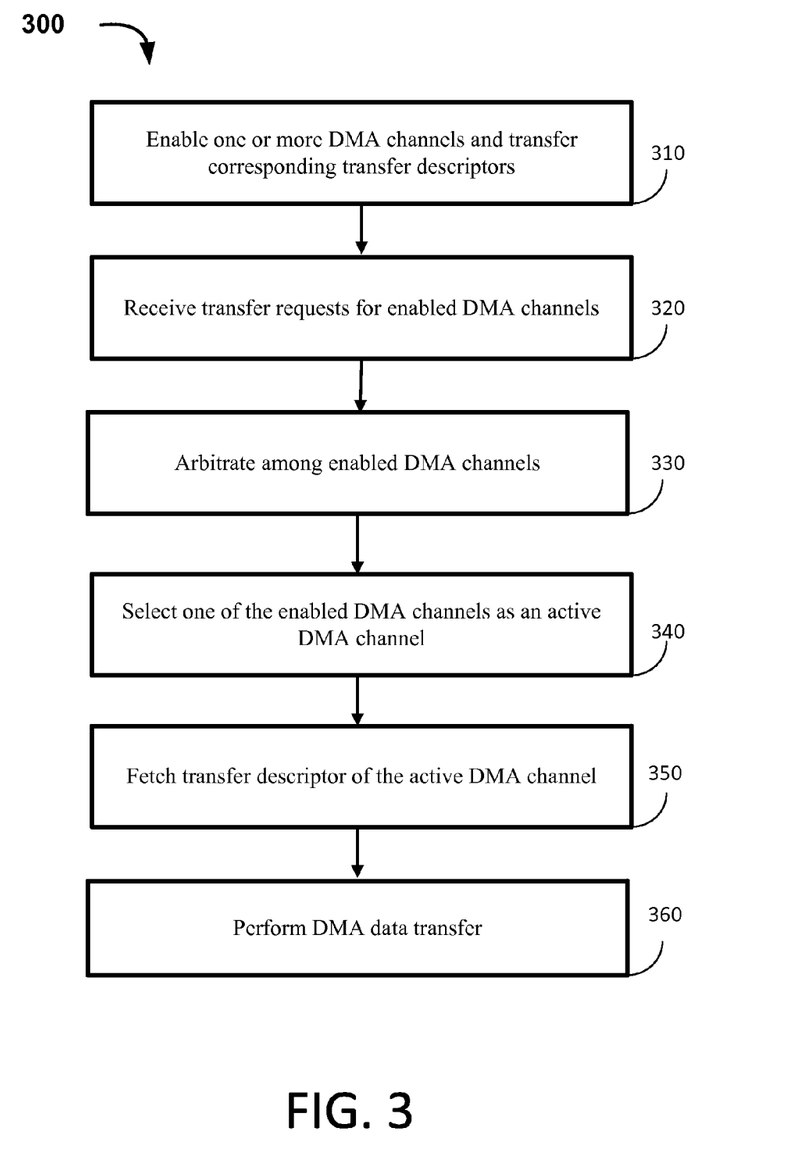
FIG. 3 is a flow diagram of an example method for controlling a DMA system.

Referring to FIG. 3 a flow diagram for a method 300 transferring data is shown. As an example, the method 300 can be performed by the system 100 of FIG. 1. The method includes enabling one or more DMA channels and transfer corresponding transfer descriptors (310). As an example, the enabling of the DMA channels can be performed by the controller 110 and with respect to FIG. 2A. DMA channel enabling can be initiated by software and can include fetching transfer descriptors of the enabled DMA channels from a first memory portion 104, and storing the fetched transfer descriptors of the enabled DMA channels to an second memory portion 106.

Transfer requests for enabled DMA channels are received (320). As an example, the transfer requests may be received by the channel arbiter 130. The transfer requests may be generated by, for example, a peripheral device 156 and received by the corresponding DMA channel through the input node 146. In one example, one of the DMA channels 120 receives a transfer request from the associated peripheral device 156 and transfers the request to the channel arbiter 130.

Arbitration is performed among enabled DMA channels (330). As an example the arbitration may be performed by the channel arbiter 130 among transfer requests received for DMA channels to determine which transfer request may be serviced. The arbitration can be performed based on DMA channel priority level wherein each channel has an assigned priority level. In some implementations, the arbitration can use scheduling scheme to ensure all DMA channel requests are serviced.

One of the enabled DMA channels is selected as the active channel (340). As an example the channel arbiter 130 selects one of the enabled DMA channels as the active channel. The selection may be performed among enabled DMA channels that have a pending transfer request.

The transfer descriptor of the active channel is fetched (350). As an example, the transfer descriptor can be fetched by the controller 110 from second memory portion 106 and placed in the active channel buffer 114 (as described above with respect to FIG. 2B). The selected active DMA channel and the transfer descriptor of the selected DMA channel may be used for a DMA data transfer.

DMA data transfer is performed (360). As an example, data may be transferred by the controller 110 and through the active DMA channel. DMA data transfer can be made between two peripheral devices, between a memory and a peripheral device, or between memories and is described in more detail with respect to FIG. 4.

In some implementations, a transfer request may be triggered in a DMA channel by a peripheral device, by an event, from software, or a combination therefrom. In some implementations, the transfer request may be sent from a DMA channel to the channel arbiter 130 when the channel associated with the transfer request is enabled.

In some implementations, priority levels may be assigned to DMA channels, one or more DMA channel may be assigned to each priority level and a DMA channel with higher priority level may interrupt any ongoing data transfer of DMA channels with lower priority levels. In some implementations, among the channels having the same priority level, a DMA channel with lower channel number may be assigned a higher priority. In some implementations, among the channels having the same priority level, a round-robin scheduling method may be implemented wherein within a priority level the last acknowledged channel request receives a lowest priority.

In some implementations, more than one physical DMA channel can be supported and the channel arbiter 130 may select more than one active DMA channel. In some implementations, a DMA channel can generate an event at the end of each transaction. In some implementations, a DMA channel can generate an event when a selectable descriptor is executed, allowing different events from different descriptors.

In some implementations, the transfer descriptors of a DMA channel may be arranged as a linked list of transfer descriptors and when enabling the DMA channel all linked transfer descriptors may be fetched from the first memory portion 104 and stored in an the second memory portion 106.

Figure 4:
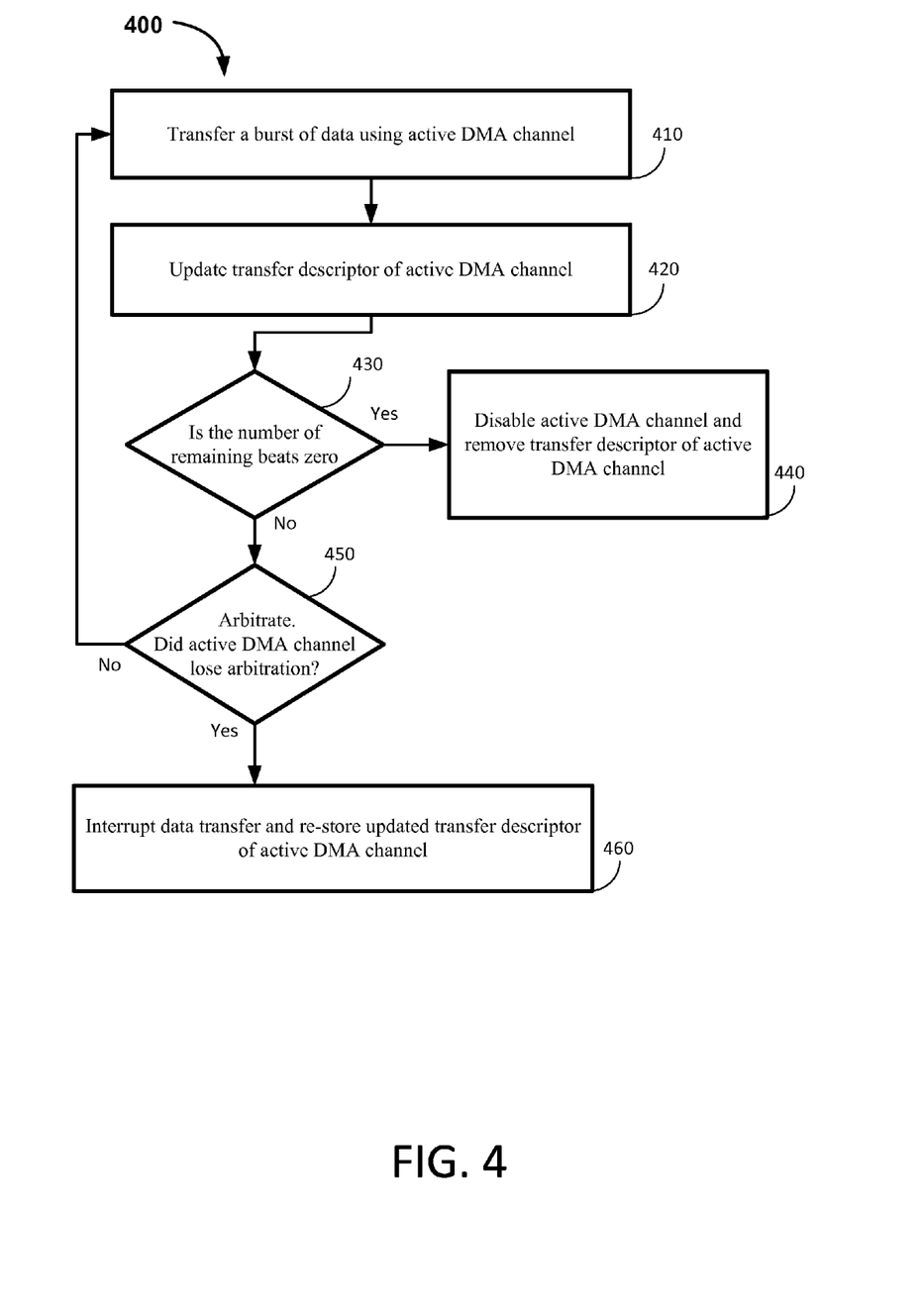
FIG. 4 is a flow diagram of an example method for performing data transfer.

Referring to FIG. 4 a flow diagram of an example method 400 for transferring a block of data is shown. As an example, the method 400 can be performed by the system 100 of FIG. 1 for transferring a block of data. The method includes transferring a burst of data using active DMA channel (410). As an example, the data transfer can be performed by the controller 110 using the active DMA channel and the transfer descriptor in active channel buffer 114. As an example, data transfer can be performed using the date transfer buffer 116 and using the data transfer bus interface 126 and system bus 140. The data transfer can originate from a memory or a peripheral device and can end in a memory or peripheral device.

The transfer descriptor of the active DMA channel is updated (420). As an example, after each burst of data transfer, the controller 110 updates the transfer descriptor of the active DMA channel in active channel buffer 114 and the update may include changing the number of remaining beats to be transferred in the BTCNT field 172.

A check is made to determine the number of remaining beats (430). As an example, after updating the transfer descriptor of the active DMA channel, the controller 110 checks the transfer descriptor in active channel buffer 114 and determines whether data transfer may be complete. The data transfer may be complete when the number of remaining beats of the transfer descriptor of the active DMA channel reaches zero.

When data transfer is complete, the active DMA channel is disabled and the transfer descriptor of the active DMA channel is removed (440). As an example, the transfer descriptor of the current active DMA channel may be removed from the second memory portion 106, indicating the disabling of the active DMA channel. Data transfer of a DMA channel may become complete when the corresponding DMA channel is designated as the active DMA channel. A disabled channel may be re-enabled, for example by software, as is described above with respect to FIG. 2A. When a data transfer is complete, arbitration can be performed among enabled DMA channels as described with respect to method 300. As discussed above, channel arbiter 130 arbitrates among enabled DMA channels having transfer requests and selects a new active DMA channel (340).

When data transfer is not complete, a re-affirmation of the selected DMA channel can be performed (i.e., arbitrate and check whether the active DMA channel loses arbitration) (450). In some implementations, arbitration can be performed by channel arbiter 130 after each burst of data transfer. In some situations, there may be a DMA channel with higher priority than the current active DMA channel and resulting in the current active DMA channel to lose arbitration. When the current active DMA channel does not lose arbitration, the data transfer continues with transferring a burst of data (410).

When the current active DMA channel loses arbitration, the data transfer is interrupted and the transfer descriptor of the active DMA channel is re-stored (460). As an example, the updated transfer descriptor of the active DMA channel may be saved to the second memory portion 106 using the write back bus interface 124.

In some implementations, the data buffer 116 can be extended and implemented as FIFO. In some implementations, the source address (SRCADDR field 176) and the destination address (DESTADDR field 174) may be updated after each burst of data transfer.

In some implementations, an interrupt can be generated when a single transfer is completed, when a multi-buffer transfer is completed, after each single transfer in multi-buffer mode of operation, or when an error occurs during the transfer.

Figure 5:
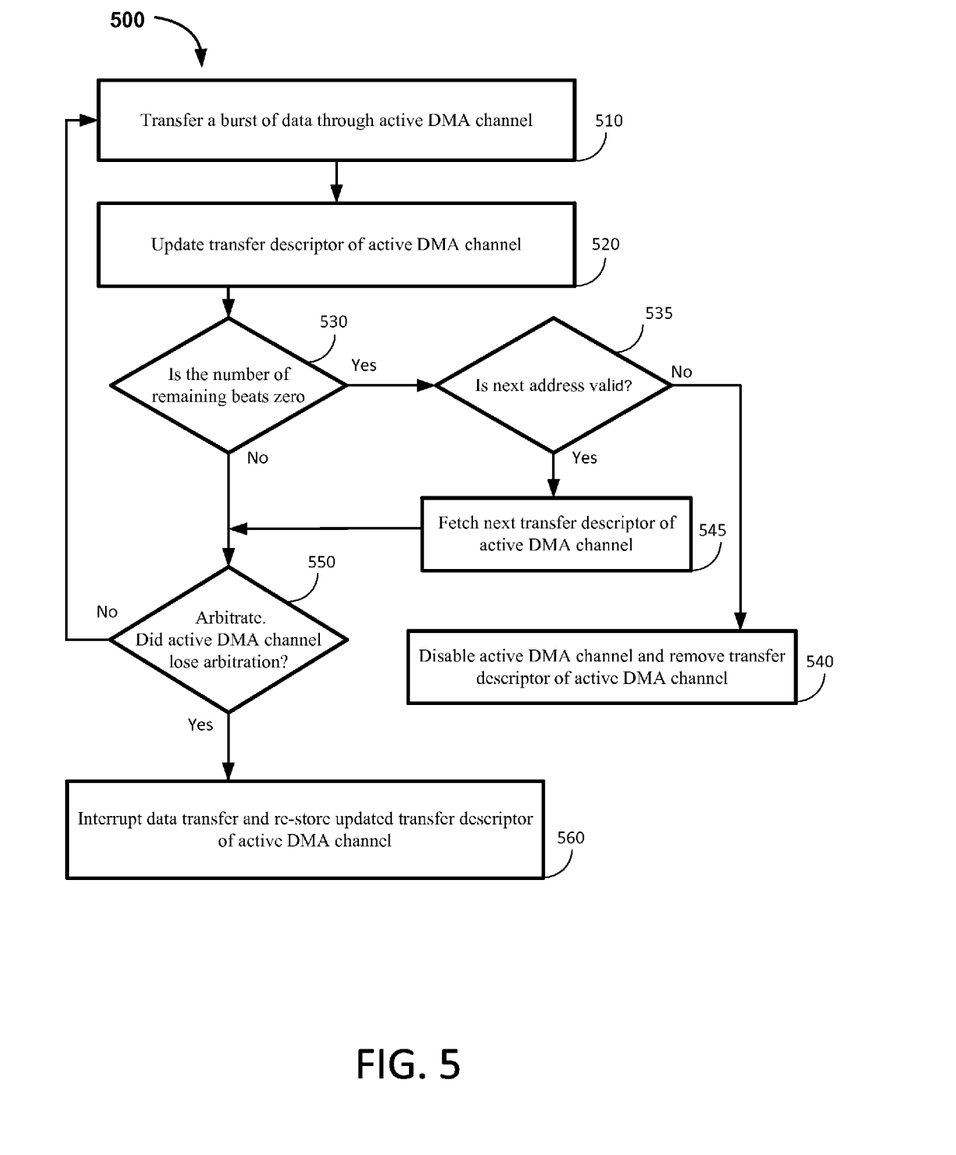
FIG. 5 is a flow diagram of an example method for performing data transfer with linked descriptors.

Referring to FIG. 5 a flow diagram of a method 500 for transferring multi blocks of data is shown. As an example, the method 500 can be performed by the system 100 of FIG. 1 for transferring multi blocks of data. The method includes transferring a burst of data using an active DMA channel (510). As an example, the data transfer can be performed by the controller 110 using the active DMA channel and the transfer descriptor in active channel buffer 114. As an example, data transfer can be performed using the active channel buffer 114 and through data transfer bus interface 126 and system bus 140. The data transfer can originate from a memory or a peripheral device and can end in a memory or peripheral device.

The transfer descriptor of the active DMA channel is updated (520). As an example, after each burst of data transfer, the controller 110 updates the transfer descriptor of the active DMA channel in the active channel buffer 114 and the update may include changing the number of remaining beats to be transferred in the BTCNT field 172.

A check is made to determine the number of remaining beats (530). As an example, after updating the transfer descriptor of the active DMA channel, the controller 110 checks the transfer descriptor in active channel buffer 114 and determines whether data transfer may be complete. The data transfer may be complete when the number of remaining beat of the transfer descriptor of the active DMA channel reaches zero.

When data transfer is complete, a check is made for a valid next address (535). As an example the controller 110 may check the next address in field 178 of the current transfer descriptor of the active DMA channel. A non-empty next address field 178 contains the address of the next transfer descriptor and the next transfer descriptor may be loaded to the active channel buffer 114.

When data transfer is complete and the next address is not valid, the active DMA channel is disabled and the transfer descriptor of the active DMA channel is removed (540). As an example, the transfer descriptor of the active DMA channel in the second memory portion 106 may be removed, indicating the disabling of the active DMA channel. A disabled channel may be re-enabled, for example by software, as described above with respect to FIG. 2A. When a data transfer is complete, arbitration may be performed among enabled DMA channels as described with respect to flow diagram 300. Channel arbiter 130 can arbitrate among enabled DMA channels having transfer requests pending and select a new active DMA channel (340).

When the next address is valid (non-empty next address field), the next transfer descriptor of the active DMA channel is fetched (545) from the indicated memory location. As an example the next transfer descriptor may be fetched by the controller 110 from the second memory portion 106 and transferred to the active channel buffer 114. Retrieving a linked transfer descriptor may indicate a multi block data transfer and that the transfer may continue using the same DMA channel.

When data transfer is not complete, a new arbitration may occur (i.e., arbitrate and check whether the active DMA channel loses arbitration) (550). In some implementations, arbitration can be performed by a channel arbiter 130 after each burst of data transfer to identify a DMA channel with higher priority than the current active DMA channel if any. When the current active DMA channel does not lose arbitration, the data transfer continues with transferring a burst of data (510).

When the current active DMA channel loses arbitration, the data transfer is interrupted and the transfer descriptor of the active DMA channel is re-stored (560). As an example, the updated transfer descriptor of the active DMA channel may be saved to the second memory portion 106 using the write back bus interface 124.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
    a memory module including:
        a first memory portion that maintains transfer descriptors of direct memory access (DMA) channels, and
        a second memory portion that maintains transfer descriptors of enabled DMA channels; and
    a controller coupled to the memory module, the controller including:
        one or more DMA channels coupled to a system bus,
        a channel arbiter that selects one of the enabled DMA channels as an active DMA channel for data transfer based on one or more criteria including re-arbitrating after each burst or beat in a given transfer, and
        an active channel buffer that receives a transfer descriptor of the active DMA channel from the second memory portion,
        wherein the controller is configured to write back the transfer descriptor of the active DMA channel into the second memory portion when the active DMA channel loses arbitration during data transfer.

2. The system of claim 1, wherein the controller is configured to communicate with one or more peripheral devices, and wherein each peripheral device is associated with a DMA channel.

3. The system of claim 1, wherein each transfer descriptor of the first memory portion corresponds to a peripheral device.

4. The system of claim 1, wherein the channel arbiter receives DMA transfer requests for the DMA channels, and wherein a DMA transfer request of a DMA channel is triggered by one or more of:
    a peripheral device,
    software, or
    an event.

5. The system of claim 1, wherein the controller uses the active DMA channel for data transfer and updates the transfer descriptor of the active DMA channel in the active channel buffer.

6. The system of claim 1 further comprising:
a first dedicated interface between the first memory portion of the memory module and the controller; and
a second dedicated interface between the second memory portion of the memory module and the controller.

7. The system of claim 5, wherein the first dedicated interface is a single directional interface coupling the first memory portion to the controller.

8. The system of claim 1, wherein the active channel buffer is a register.

9. The system of claim 1, wherein the controller is coupled to a peripheral bus interface to enable configuration of the controller by an external device.

10. The system of claim 1, wherein a transfer descriptor defines a block data transfer and includes one or more parameters:
a source address of a transfer,
a destination address of the transfer,
a number of remaining transfer beats,
control data including transfer settings, or
an address of a next descriptor.

11. The system of claim 10, wherein during data transfer the controller is configured to update one or more parameters of the transfer descriptor of the active DMA channel including:
the source address of a transfer,
the destination address of the transfer, or
the number of remaining transfer beats.

12. The system of claim 1, wherein software is configured to enable or disable the DMA channels.

13. The system of claim 10, further comprising:
when a number of remaining transfer beats of a transfer descriptor of an enabled DMA channel reaches zero, the DMA channel is disabled and the transfer descriptor of the DMA channel is removed from the second memory portion.

14. A method comprising:
enabling one or more direct memory access (DMA) channels;
receiving transfer requests for enabled DMA channels;
arbitrating among enabled DMA channels having pending transfer requests, based on one or more criteria;
selecting one of the enabled DMA channels as an active DMA channel based on the arbitrating;
fetching a first transfer descriptor of the active DMA channel;
performing data transfer using the active DMA channel; and
during the performing, checking to determine when the active DMA channel has a priority that is less than a priority for another one of the enabled DMA channels and when so, disabling the then active DMA channel including writing back to memory a current state of the first transfer descriptor and making the another one of the enabled DMA channels the active DMA channel.

15. The method of claim 14, wherein performing data transfer further includes:
transferring bursts of data;
updating the first transfer descriptor of the active DMA channel after each burst of data including a number of remaining transfer beats; and
performing, after each burst of data, one of:
disabling the active DMA channel and clearing the first descriptor of the active DMA channel when the number of remaining transfer beats reaches zero, or
interrupting the data transfer and re-storing the updated first transfer descriptor of the active DMA channel when losing arbitration.

16. The method claim 14, wherein a transfer descriptor including one or more parameters:
a source address of a transfer,
a destination address of the transfer,
the number of remaining transfer beats,
control data including transfer settings, or
an address of a next descriptor.

17. The method of claim 15, wherein updating the transfer descriptor further comprises updating one or more parameters of the transfer descriptor including:
the number of remaining transfer beats,
the source address of a transfer, or
the destination address of the transfer.

18. The method of claim 14, wherein enabling one or more direct memory access (DMA) channels include:
fetching transfer descriptors of the DMA channels, and
storing the received transfer descriptors of the enabled DMA channels.

19. The method of claim 14, further comprising:
retrieving a second descriptor of the active DMA channel when the number of remaining transfer beats of the first descriptor reaches zero, wherein the second descriptor is retrieved using an address of a next descriptor of the first transfer descriptor.

20. The method of claim 14, further comprising:
assigning priority levels to each DMA channel, wherein a DMA channel with higher priority level interrupts any ongoing data transfers through DMA channels with lower priority levels.

* * * * *